United States Patent [19]

Slates

[11] Patent Number: 5,842,334
[45] Date of Patent: Dec. 1, 1998

[54] CONSTANT FORCE HARVESTER RAILS

[75] Inventor: Larry Losli Slates, Madera, Calif.

[73] Assignee: FMC Corporation, Chicago, Ill.

[21] Appl. No.: 678,730

[22] Filed: Jul. 11, 1996

[51] Int. Cl.$^6$ .................................................. A01D 46/26
[52] U.S. Cl. ...................... 56/340.1; 56/330; 56/DIG. 11
[58] Field of Search ............................ 56/10.9, 329, 330, 56/331, 328.1, 340.1, DIG. 11

[56] References Cited

U.S. PATENT DOCUMENTS

| | | | |
|---|---|---|---|
| 3,338,040 | 8/1967 | Shipley | 56/340.1 |
| 3,667,797 | 6/1972 | Kilby | 56/340.1 X |
| 4,286,426 | 9/1981 | Orlando et al. | 56/330 |
| 4,432,190 | 2/1984 | Orlando | 56/330 X |
| 4,793,128 | 12/1988 | Creed | 56/330 |
| 5,473,875 | 12/1995 | Zehavi et al. | 56/340.1 |
| 5,495,708 | 3/1996 | Scott et al. | 56/329 |

FOREIGN PATENT DOCUMENTS

| | | | |
|---|---|---|---|
| 2345059 | 10/1977 | France | 56/330 |
| 2417247 | 10/1979 | France | 56/330 |
| 2417248 | 10/1979 | France | 56/330 |
| 434915 | 11/1974 | U.S.S.R. | 56/340.1 |
| 581905 | 11/1977 | U.S.S.R. | 56/340.1 |
| 1170988 | 8/1985 | U.S.S.R. | 56/340.1 |
| 1722290 | 3/1992 | U.S.S.R. | 56/340.1 |

*Primary Examiner*—John A. Ricci
*Attorney, Agent, or Firm*—Ronald C. Kamp

[57] ABSTRACT

The invention provides a harvester that applies continuous contact between the plant to be harvested and harvesting rails, which thus reduces damage to the plant. The harvester uses a hydraulic system which causes the rails to provide a constant gripping force against the plants when in a float position of the hydraulic system. The system also has a spread setting and may or may not have a third static setting.

20 Claims, 8 Drawing Sheets

FIG_1

FIG_4

FIG_6

FIG_7

FIG_8

CONSTANT FORCE HARVESTER RAILS

BACKGROUND OF THE INVENTION

In harvesters such as grape harvesters, rails are used to apply a force against a plant for removal of fruit. Such rails cause damage to the plants. In a prior art grape harvester, such as described in U.S. Pat. No. 4,432,190, incorporated by reference, a hydraulic cylinder is used to provide a spacing between shaker rails. If the spacing was too small, the rails would not fit around a grape vine trunk and therefore would pinch the trunk or break it, thus damaging the trunk. If the spacing was too large, the rails may strike the stump too hard, thus damaging the trunk.

SUMMARY OF THE INVENTION

It is an object of the invention to provide a harvester that reduces damage to plants.

It is another object of the invention to provide a harvester with shaker rails that provide a low magnitude constant gripping force to the plant.

The invention provides a hydraulic cylinder which allows the rails on a harvester to apply an adjustable gripping force against the plant, reducing damage to the plant. The damage to the plant is reduced for two reasons. One is because the rails are in constant contact with the trunk or canopy and therefore do not hit the trunk with a high impact. The second reason is that the shaker head can be run at a slower speed because there is no lost relative motion between the rails and the trunk or canopy. This slower frequency of shaking also reduces damage to plants.

DESCRIPTION OF THE PREFERRED EMBODIMENTS

Figure 1:
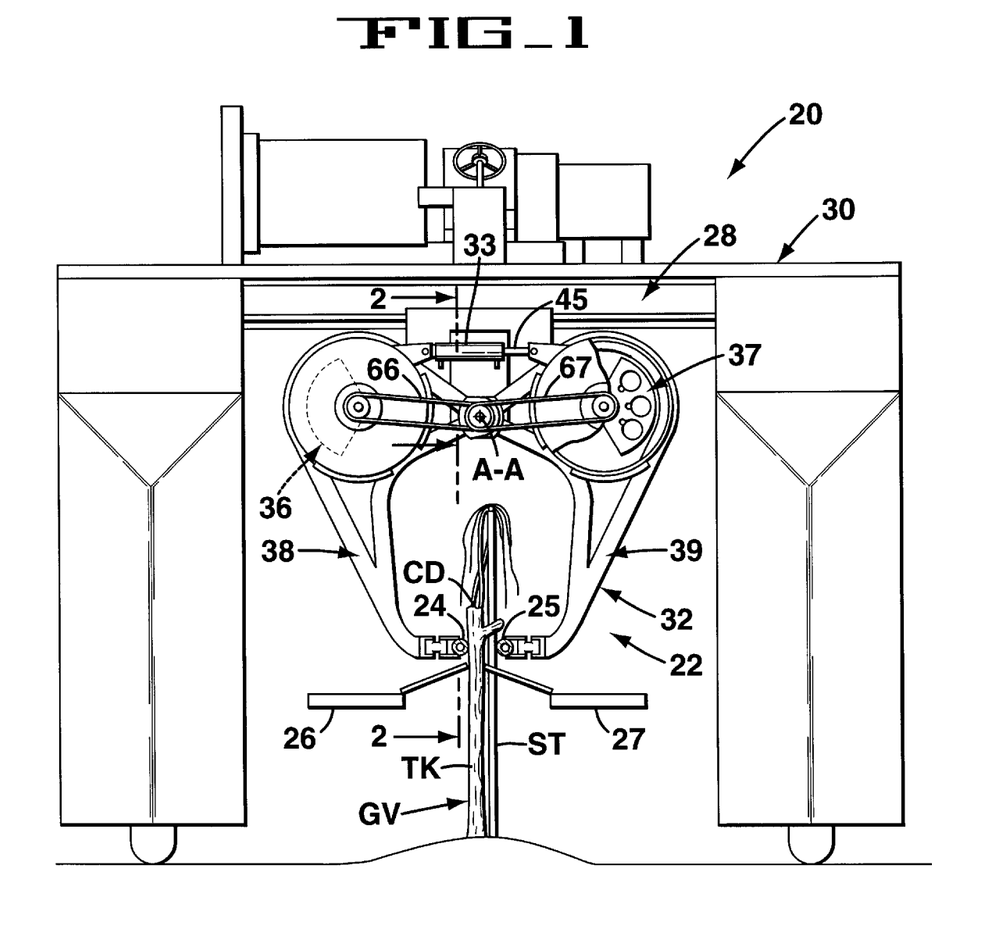
FIG. 1 is a diagrammatic front end elevation of a grape harvester which utilizes a preferred embodiment of the invention.
Figure 2:
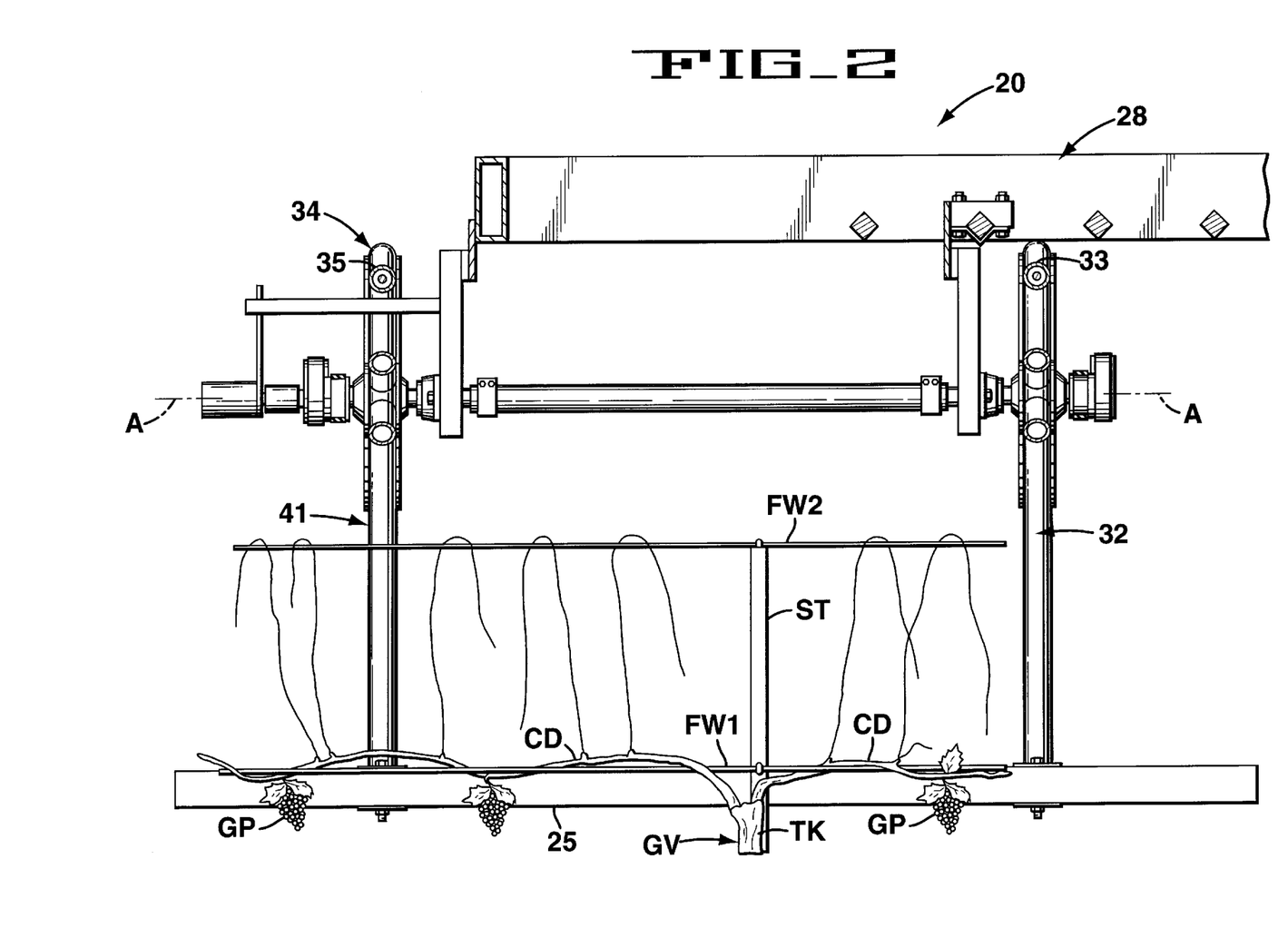
FIG. 2 is cross sectional view of the harvester taken generally on line 2—2 of FIG. 1.

FIG. 1 is a diagrammatic front end elevation of a grape harvester 20, which includes a shaker assembly 22 which utilizes a preferred embodiment of the invention. The shaker assembly 22 includes a pair of opposed, horizontal and transversely spaced right striker bar 24 and left striker bar 25. The striker bars 24, 25 are positioned at opposite sides of the grape vines at a height that is generally aligned with the cordons CD of the grape vines (FIGS. 1 and 2). As illustrated in FIG. 2, the grapevines are supported on a fruit support structure consisting of longitudinally spaced, vertical stakes ST and horizontal fruiting wires FW1 and FW2 connected between the stakes ST. The lower wire FW1 supports the cordons of the grapevines from which bunches of grapes GP depend, and the upper wire FW2 supports non-fruit bearing canes that form a canopy. The shaker assembly 22 is adapted to oscillate the striker bars 24, 25 about an axis A—A that is spaced above the tops of the stakes ST and grapevines. As the harvester 20 is driven down a row of grapevines, the oscillating striker bars 24, 25 alternately impact opposite sides of the trunks TK and cordons CD of the grapevines to dislodge the grapes therefrom. The grapes GP dislodged from the grapevines GV are collected on parallel conveyors 26 and 27.

The harvester 20 includes a vehicle 30 having a conventional inverted U-shape in end elevation that is adapted to straddle the row of grapevines GV to be harvested. The shaker assembly 22 and the fruit collection conveyors 26, 27 are also adapted to straddle the row and are both suspended from a main frame 28 of the vehicle 30. The vehicle 30 includes conventional leveling means for maintaining the shaker assembly 22 in a horizontal side to side orientation. The shaker assembly 22 includes a front shaker frame 32 and a rear shaker frame 34 that are suspended from the main frame 28 of the vehicle 30 to pivot about a common axis A—A.

Eccentric weight assemblies 36 and 37 are rotatably mounted to the front shaker frame 32 for rotation about parallel axes that are equidistantly spaced from the rotational axis A—A. The equidistant spacing of the two eccentric weight assemblies 36, 37 is such that when they are rotated in the same direction and at 180° out-of-phase relative to each other (FIG. 1), a rocking couple type of shaking force is alternately applied by shaker arms 38, 39 to the striker bars 24, 25. As the eccentric weights are rotated, first the shaker frame pivots about axis A—A in one direction, for example to the right, to cause one of the striker bars 24, 25, in this example the left striker bar, 25, to push the trunk TK in one direction, in this example towards the right striker bar 24, by applying a net total force, the sum of the force from the left striker bar 25 and the right striker bar, towards the right striker bar 25. Then the other striker bar, in this example the right striker bar 24, is pivoted, creating a net total force to push the trunk TK in the opposite direction, in this example to the left towards the left striker bar 25. This changing net total force, creates an alternating force. The eccentric weight assemblies 36, 37 of the front shaker frame 32 are driven by timing belts 66 and 67, respectively.

A front hydraulic cylinder 33 is mechanically connected between the shaker arms 38, 39 of the of the front shaker frame 32. The front hydraulic cylinder 33 is located above the axis of rotation A—A. A rear hydraulic cylinder 35 is mechanically connected between the shaker arms 41 of the rear shaker frame 34. The rear hydraulic cylinder 35 is located above the axis of rotation A—A.

Figure 3:
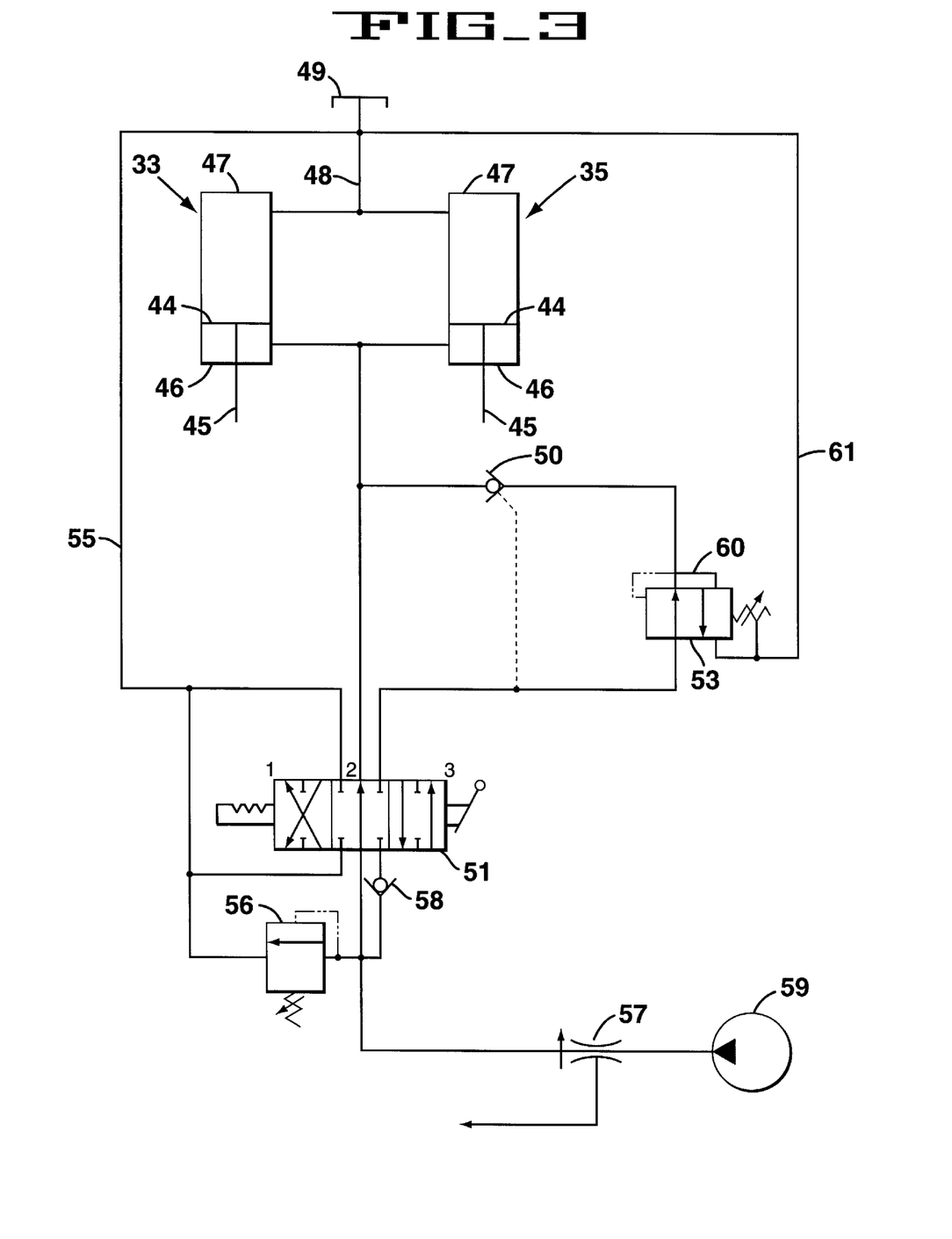
FIG. 3 is a schematic view of the hydraulic system of a preferred embodiment of the invention used in the harvester illustrated in FIG. 1.

FIG. 3 is a schematic illustration of the hydraulics in fluid connection with the front hydraulic cylinder 33 and the rear hydraulic cylinder 35. The front hydraulic cylinder 33 and the rear hydraulic cylinder 35 each have a piston head 44 on a rod 45 passing into rod ends 46 of the front and rear hydraulic cylinders 33, 35. Piston ends 47 of the hydraulic cylinders 33, 35 are opposite from the rod ends 46. The piston ends 47 of the hydraulic cylinders 33, 35 are in fluid connection with a reservoir 49 by a cylinder drain line 48. In the specification and claims, "fluid connection" is defined as having a conduit to allow fluid to flow from one object to the other. The rod ends 46 of the hydraulic cylinders 33, 35 are in fluid connection with a first end of a pilot operated check valve 50 and a second connection on a three position valve 51. A second connection of the pilot operated check valve 50 is in fluid connection with a first connection of a pressure reducing valve 53. A second connection of the pressure reducing valve 53 is in fluid connection with the pilot of the pilot operated check valve 50 and a first connection of the three position valve 51. A third connection of the three position valve 51 is in fluid connection with the reservoir 49 through the pressure relief valve drain line 55, a first connection of a pressure relief valve 56, and a fourth connection of the three position valve 51. A second connection of the pressure relief valve 56 is in fluid connection with a first connection of a priority flow divider 57, a first connection of a check valve 58, and a fifth connection of the three position valve 51. A third connection of the pressure reducing valve 53 is in fluid connection with the reservoir 49 through a pressure reducing valve drain line 61. A second connection of the check valve 58 is in fluid connection with a sixth connection of the three position valve 51. A second connection of the priority flow divider 57 is in fluid connection with a hydraulic pump 59.

In operation, when the three position valve 51 is in the first position, the three position valve 51 directs fluid from the first connection to the fourth connection, and fluid from the sixth connection to the third connection, while stopping the flow of fluid at the second and fifth connection. Fluid passing from the hydraulic pump through the priority flow divider 57 is stopped at the fifth connection by the three position valve 51, and flows from the sixth connection to the third connection and then to the reservoir 49 by way of the pressure relief valve drain line 55. If fluid flows from the flow divider 57 through the pressure relief valve 56, it will also flow to the reservoir 49 by way of the pressure relief valve drain line 55. The pressure relief valve 56 is set so that if pressure from the flow divider 57 is too high, the pilot of the pressure relief valve 56 will cause the pressure relief valve 56 to open. Fluid at the piston end 47 of the front and rear hydraulic cylinders 33, 35 is able to flow to and be drawn from the reservoir 49 through the cylinder drain line 48. Fluid from the rod ends 46 of the front and rear hydraulic cylinders 33, 35 is capped by the three position valve 51 and is unable to flow from the rod ends 46 through the pilot operated check valve 50, since there is no pressure from the pilot, thus trapping the fluid in the rod end 46 of the front and rear hydraulic cylinders 33, 35. This prevents the striker bars 24, 25 from getting closer together. Gravity keeps the striker bars 24, 25 from spreading apart. This causes the striker bars 24, 25 to remain a constant distance apart. This is the static position, because the distance between the striker bars 24, 25 remains static. The purpose of the static position is to dump fluid from the hydraulic pump 59 directly to the reservoir 49, without creating resistance heat by porting it through the pressure relief valve 56.

When the three position valve 51 is in the second position, the three position valve 51 directs fluid from the fifth connection to the second connection, while stopping flow of fluid from the first, third, fourth and sixth connections. Fluid at the piston end 47 of the front and rear hydraulic cylinders 33, 35 is able to flow to the reservoir 49 by way of the cylinder drain line 48. Fluid from the hydraulic pump 59 passes through the priority flow divider 57 to the fifth connection of the three position valve 51, through the three position valve 51 to the second connection of the three position valve 51 and to the rod ends 46 of the front and rear hydraulic cylinders 33, 35. This pushes the piston heads 44 towards the piston ends 47, which causes the distance between the striker bars 24, 25 to increase. This is the spread position, because it causes the distance between the striker bars 24, 25 to increase and thus spreads the striker bars 24, 25 apart. The striker bars continue to spread until the hydraulic cylinders are completely collapsed. At this point fluid from the priority flow divider 57 passes through the relief valve 56 to the reservoir 49 by way of the pressure relief valve drain line 55.

When the three position valve 51 is in the third position, the three position valve 51 directs fluid from the sixth connection to the first connection, and fluid from the third connection to the fourth connection, while stopping the flow of fluid at the second and fifth connection. Fluid at the piston end 47 of the front and rear hydraulic cylinders 33, 35 is able to flow to the reservoir 49 by way of the cylinder drain line 48. Fluid passing from the hydraulic pump through the priority flow divider 57 is stopped by the three position valve 51 at the fifth connection, and flows from the sixth connection to the first connection putting pressure on the pilot of the pilot operated check valve 50 and in addition flows to the second connection of the pressure reducing valve 53. Fluid may flow from the second connection of the pressure reducing valve 53 to the first connection of the pressure reducing valve, through the pilot operated check valve 50 into the rod ends 46 of the front and rear cylinders 33, 35. If too much pressure is provided to the rod ends 46 of the front and rear cylinders 33,35, then fluid from the rod end 46 of the front and rear hydraulic cylinders 33, 35 is capped by the three position valve 51 at the second connection, but is able to flow through the pilot operated check valve 50, since there is pressure on the pilot from the sixth connection of the three position valve 51. This puts pressure on the pilot of the pressure reducing valve 53 moving the pressure reducing valve over so that fluid may flow through a bypass 60 to the reservoir 49 by way of the pressure reducing valve drain line 61. This also stops the flow of fluid from the pump 59 to the rod ends 46. The pressure reducing valve 53 pressure is operator adjusted and set to counter act most of the force of gravity on the shaker arms 38, 39. This causes the striker bars 24, 25 to close under the force of gravity alone, but also provides a hydraulic force to counter gravity so that a certain small force on the striker bars 24, 25 would be able to spread them. This is the float position.

When the striker bars 24, 25 approach a trunk TK in the float position, the force from the trunk TK is able to cause the striker bars 24, 25 to spread to allow passage of the trunk TK in between the striker bars 24, 25 without damaging the trunk TK. In the float position, the striker bars 24, 25 are kept in contact with the trunk TK, with gravity forcing the striker bars 24, 25 together to apply force to the trunk TK and with the hydraulic system counteracting most of the force of gravity, so that too much force is not applied to the trunk TK, which might damage the trunk TK. This constant force (gripping force) keeps the striker bars 24, 25 in constant contact with the trunk TK. The eccentric weight assemblies 36, 37 are rotated, causing an alternating force to be applied by the striker bars 24, 25 to the trunk TK. Since the striker bars 24, 25 are in contact with the trunk TK, slapping by the striker bars 24, 25 to the trunk TK is eliminated, reducing damage to the trunk TK. Also, since the striker bars are in continuous contact with the trunk; all of the alternating force caused by the eccentric weights is applied to the trunk and vines. There is no lost motion as there would be without this system because the striker bars do not need to be set wider than the largest trunk so as not to pinch, scuff, and/or break off the trunk. Since all of the alternating force is applied to the trunk, the frequency of the shaker can be reduced which in turn damages the trunk and canes of the vines to a lesser extent.

Figure 4:
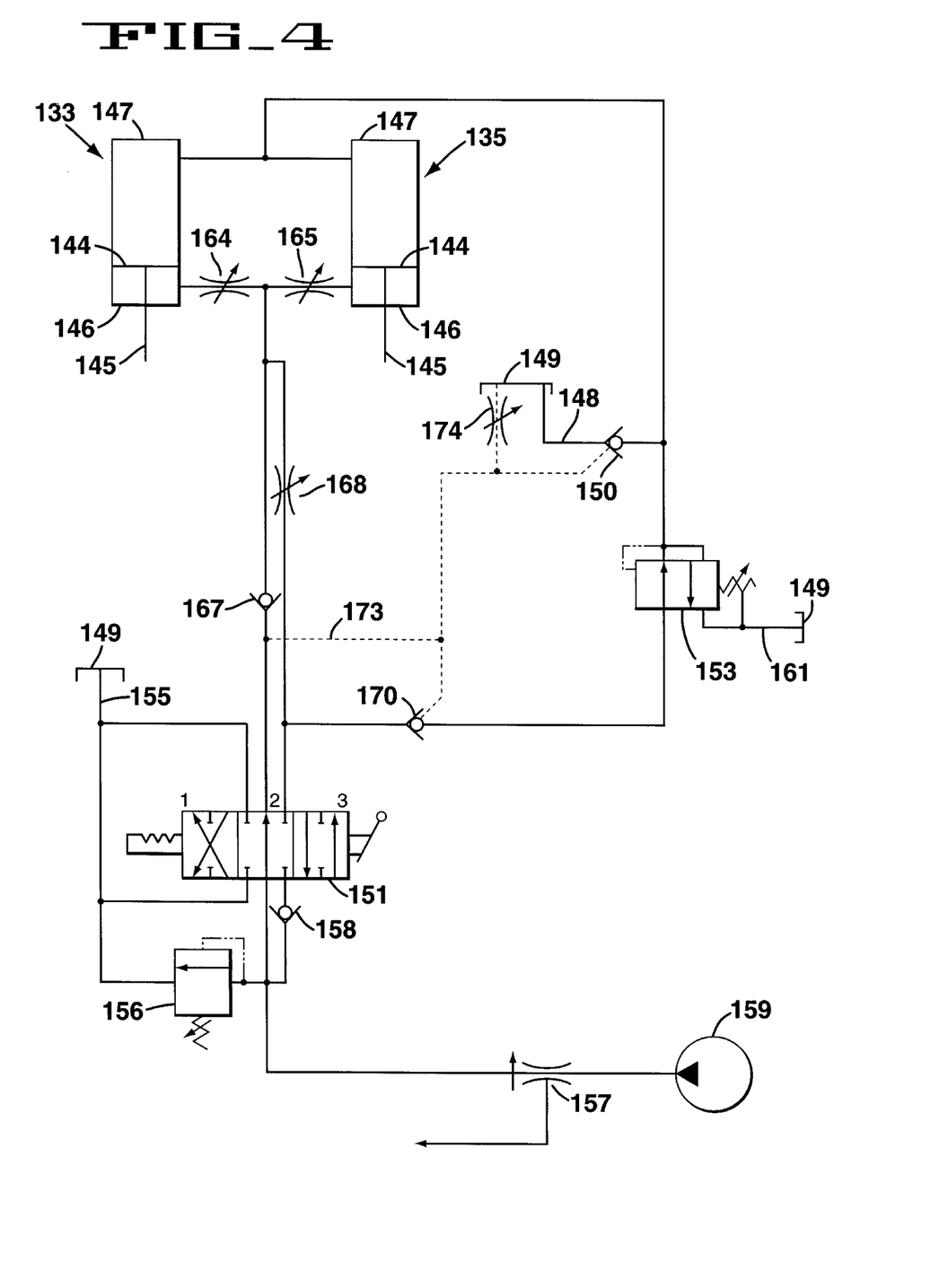
FIG. 4 is a schematic view of another embodiment of a hydraulic system which may be used in a preferred embodiment of the invention used in the harvester illustrated in FIG. 1.

FIG. 4 is a schematic illustration of a hydraulic system in fluid connection with a front hydraulic cylinder 133 and a rear hydraulic cylinder 135, which may be used in the harvester illustrated in FIGS. 1 and 2, with the front hydraulic cylinder 133 of this embodiment replacing the front hydraulic cylinder 33 of FIGS. 1 and 2, and the rear hydraulic cylinder 135 of this embodiment replacing the rear hydraulic cylinder 35 of FIG. 2. The front hydraulic cylinder 133 and the rear hydraulic cylinder 135 each have a piston head 144 on a rod 145 passing into rod ends 146 of the front and rear hydraulic cylinders 133, 135. Piston ends 147 of the hydraulic cylinders 133, 135 are opposite from the rod ends 146. The piston ends 147 of the hydraulic cylinders 133, 135 are in fluid connection with a first connection of a first pilot operated check valve 150 and a first connection of a pressure reducing valve 153. A second connection of the first pilot operated check valve 150 is in fluid connection with a reservoir 149 by a cylinder drain line 148. The rod end 146 of the front hydraulic cylinder 133 is in fluid connection with a first connection of a front restrictor valve 164. The rod end of the rear hydraulic cylinder 135 is in fluid connection with a first connection of a rear restrictor valve 165. A second connection of the front restrictor valve 164 is in fluid connection with a second connection of the rear restrictor valve 165, a first connection of a first non-pilot check valve 167, and a first connection of a flow restrictor valve 168. A second connection of the first non-pilot check valve 167 is in fluid connection with a second connection on a three position valve 151 and a pilot line 173. A second connection of the flow restrictor valve 168 is in fluid connection with a first connection of a second pilot operated check valve 170 and a first connection on the three position valve 151. A second connection of the second pilot operated check valve 170 is in fluid connection with a second connection of the pressure reducing valve 153. A third connection of the three position valve 151 is in fluid connection with the reservoir 149 through the pressure relief valve drain line 155, a first connection of a pressure relief valve 156, and a fourth connection of the three position valve 151. The reservoir 149 is drawn at three locations to simplify the illustration, but is a single reservoir in this embodiment. A second connection of the pressure relief valve 156 is in fluid connection with a first connection of a priority flow divider 157, a first connection of a second non-pilot check valve 158, and a fifth connection of the three position valve 151. A second connection of the second non-pilot check valve 158 is in fluid connection with a sixth connection of the three position valve 151. A second connection of the priority flow divider 157 is in fluid connection with a hydraulic pump 159. A third connection of the pressure reducing valve 153 is in fluid connection with the reservoir 149 through a pressure reducing valve drain line 161. The pilot line 173 is in fluid connection with the pilots of the first and second pilot operated check valves 150, 170 and to a first connection of a pilot restrictor valve 174. The second connection of the pilot restrictor valve 174 is in fluid connection with the reservoir 149.

In operation, when the three position valve 151 is in the first position, the three position valve 151 directs fluid from the first connection to the fourth connection, and fluid from the sixth connection to the third connection, while stopping the flow of fluid at the second and fifth connection. Fluid passing from the hydraulic pump through the priority flow divider 157 is stopped at the fifth connection by the three position valve 151, and flows from the sixth connection to the third connection and then to the reservoir 149 by way of the pressure relief valve drain line 155.

When the piston heads 144 moves away from the piston ends 147, hydraulic fluid is drawn from the reservoir 149, through the first pilot controlled check valve 150 into the piston ends 147. Fluid from the rod end 146 of the front and rear hydraulic cylinders 133, 135 passes through the front and rear restrictor valves 164, 165, respectively, to the first connection of the first non-pilot check valve 167 and the first connection of the flow restrictor valve 168. The first non-pilot check valve 167 prevents fluid from flowing through. The flow restrictor valve 168 allows fluid to flow through to the first connection of the second pilot operated check valve 170 and to the first connection of the three position valve 151. Since the three position valve 151 is in the first position, fluid flows from the first connection through the three position valve 151 to the fourth connection and then to the reservoir 149. So the piston heads 144 are able to move away from the piston ends 147 of the front and rear hydraulic cylinders 133, 135 without resistance from the hydraulic system, allowing the shaker bars 24, 25 to come together without resistance from the hydraulic system.

This causes the striker bars 24, 25 to allow gravity to close them to a rest position. This is the static position, because the striker bars 24, 25 fall to a rest position and then remain static. The purpose of the static position is to dump fluid from the hydraulic pump 159 directly to the reservoir 149, without creating resistance heat by porting it through the pressure relief valve 156.

When the three position valve 151 is in the second position, the three position valve 151 directs fluid from the fifth connection to the second connection, while stopping flow of fluid from the first, third, fourth and sixth connections. Fluid from the hydraulic pump 159 passes through the priority flow divider 157 to the fifth connection of the three position valve 151, through the three position valve 151 to the second connection of the three position valve 151, then through the first non-pilot check valve 167 to the front and rear restrictor valves 164, 165 to the rod ends 146 of the front and rear hydraulic cylinders 133, 135. This also places a pressure on the pilot line 173, which opens the first pilot controlled check valve 150, allowing fluid to flow from the piston ends 147 of the front and rear hydraulic cylinders 133, 135 through the cylinder drain line 148 to the reservoir 149. This pushes the piston heads 144 towards the piston ends 147, which causes the distance between the striker bars 24, 25 to increase. This is the spread position, because it causes the distance between the striker bars 24, 25 to increase and thus spreads the striker bars 24, 25 apart. The striker bars continue to spread until the hydraulic cylinders are completely collapsed. At this point fluid from the priority flow divider 157 passes through the relief valve 156 to the reservoir 149 by way of the pressure relief valve drain line 155.

When the three position valve 151 is in the third position, the three position valve 151 directs fluid from the sixth connection to the first connection, and fluid from the third connection to the fourth connection, while stopping the flow of fluid at the second and fifth connection. Fluid passing from the hydraulic pump 159 through the priority flow divider 157 is stopped by the three position valve 151 at the fifth connection, and flows from the sixth connection to the first connection and then to the second connection of the flow restrictor valve 168 and the first connection of the second pilot operated check valve 170. The fluid flows from the second connection of the float restrictor valve 168 through the front and rear restrictor valves 164, 165 into the rod ends 146 of the front and rear hydraulic cylinders 133, 135. Fluid passes through the second pilot operated check valve 170 and through the pressure reducing valve 153 to the piston ends 147 of the front and rear hydraulic cylinders 133, 135.

If pressure in the piston ends 147 of the front and rear cylinders 133, 135 overcomes the operator set pressure of the pressure reducing valve 153, enough pressure is applied to the pilot of the pressure reducing valve 153 to move the pressure reducing valve over so that fluid may flow through a bypass to the reservoir 149 by way of the pressure reducing valve drain line 161. The pressure reducing valve 153 pressure is operator adjusted and set to counter act most of the force of gravity on the shaker arms 38, 39.

Providing hydraulic pressure on both sides of the piston head 144, provides power to both open and close the striker bars 24, 25. Because of the cross sectional area of the rod 145, the area of the piston head 144 facing the rod end 146 is smaller than the area of the piston head 144 facing the piston end 147. Since the hydraulic pressure on both sides of the piston head 144 is equal, and since force on a side of a piston head 144 is equal to the area of that side times the pressure, the net constant force by the hydraulic fluid on the piston head is equal to the hydraulic pressure times the difference between the area of the side of the piston head 144 facing the piston end 147 and the area of the side of the piston head 144 facing the rod end 146. The net constant force pushes the piston head 144 towards the rod end 146 providing a force to close the striker bars 24, 25. When a trunk TK is encountered by the striker bars 24, 25, the striker bars 24, 25 encounter an opposing force created by the trunk TK, which increases the hydraulic pressure in the front and rear hydraulic cylinders 33, 35, thus increasing the net constant force. The operator adjustable pressure reducing valve 153, sets the maximum pressure in the front and rear hydraulic cylinders 33, 35, which sets a maximum net constant force, which sets the force required in order for the trunk TK to spread the striker bars 24, 25. The operator adjusts the speed that the striker bars 24, 25 spread and close by adjusting the front and rear restrictor valves 164, 165, and the flow restrictor valve 168. This is the float position. Providing a force to close the striker bars 24, 25 may be needed when gravity is insufficient to overcome friction in the mechanical system at the pivot at axis A—A of FIG. 1, to allow closing of the striker bars by gravity alone.

Figure 5:
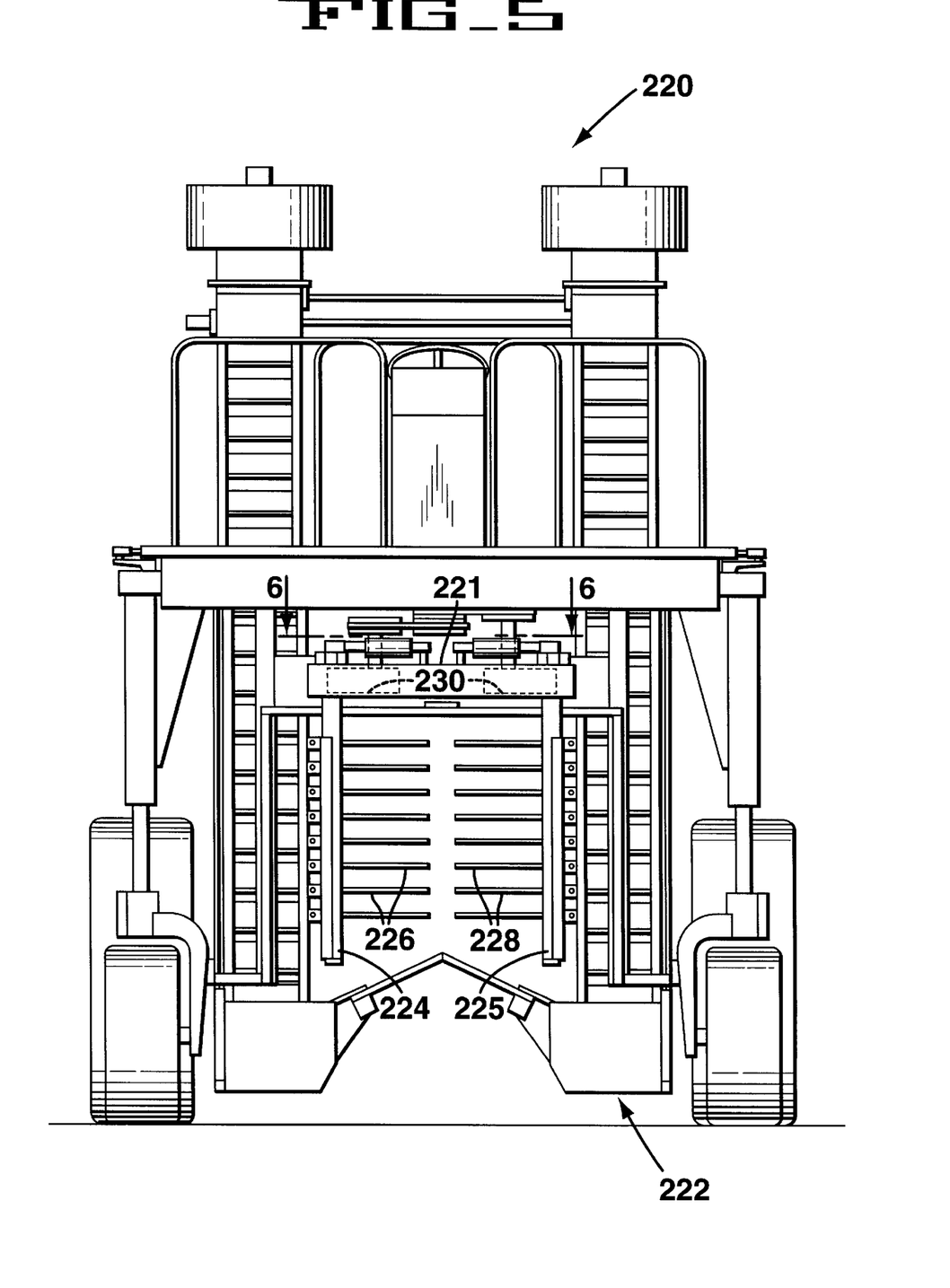
FIG. 5 is a diagrammatic front end view of another grape harvester, which uses another embodiment of the invention.
Figure 6:
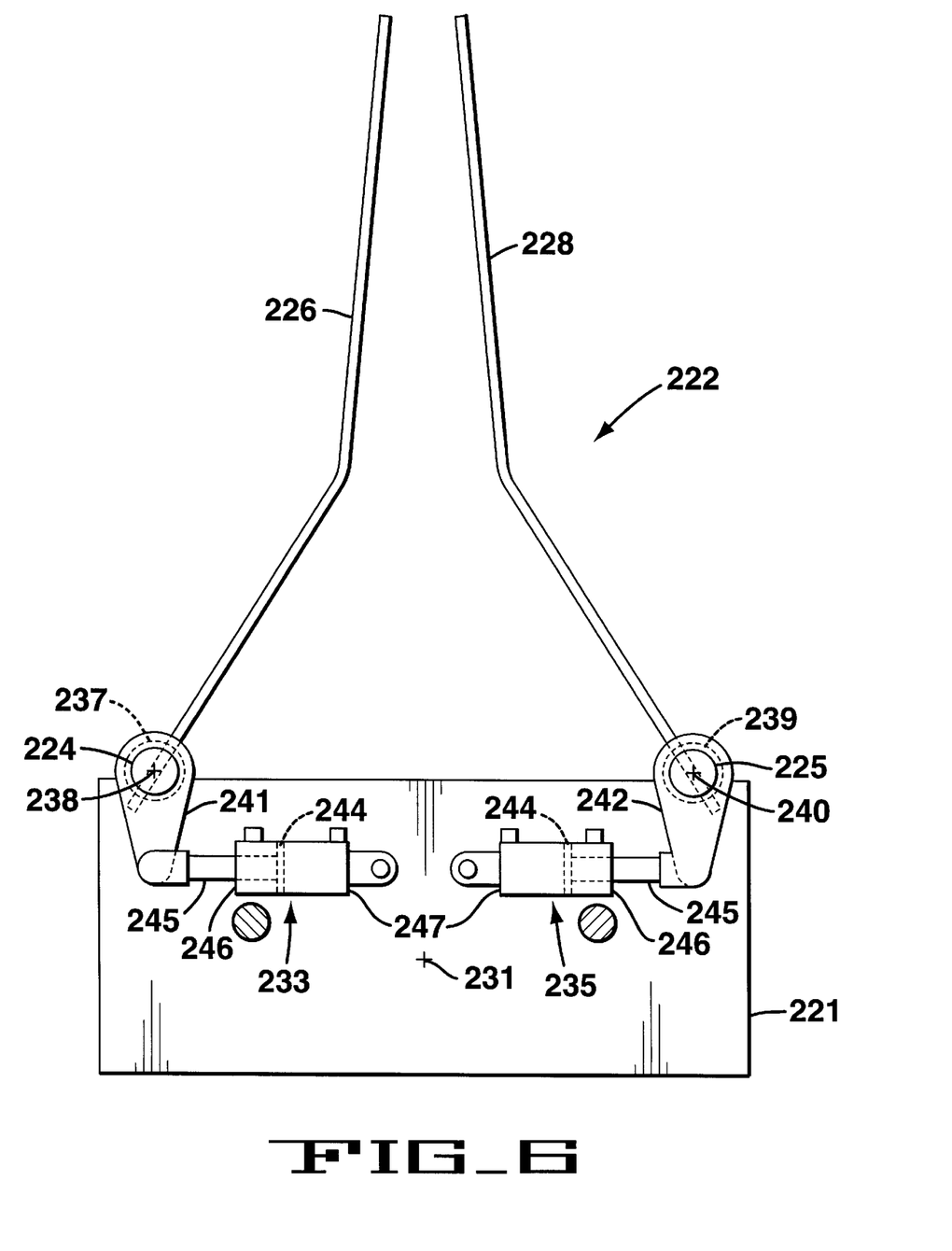
FIG. 6 is a top view of the harvester illustrated in FIG. 5 along lines 6—6.

Another harvester 220, FIGS. 5 and 6, includes a shaker assembly 222, which utilizes a preferred embodiment of the invention. This harvester 220 is a type of canopy harvester with a force balanced drive as described in U.S. Pat. No. 5,495,708, incorporated by reference. The shaker assembly 222 comprises a weight box 221 and extending downwardly from the weight box 221 a pair of opposed, vertical and transversely spaced first leg 224 and second leg 225. The first and second legs 224, 225 are positioned at opposite sides of the weight box 221. A first plurality of rods 226 are connected to the first leg 224. A second plurality of rods 228 are connected to the second leg 225. The weight box 221 contains a set of eccentric weights 230 to oscillate the weight box 221 about a weight box axis 231.

The first leg 224 is mounted to the weight box 221 with a first bearing 237 allowing the first leg 224 to rotate about a first leg axis 238 extending along the length of the first leg 224. The second leg 225 is mounted to the weight box 221 with a second bearing 239 allowing the second leg 225 to rotate about a second leg axis 240 extending along the length of the second leg 225. A first end of a first cylinder 233 is mounted to the weight box 221. A first end of a second cylinder 235 is mounted to the weight box 221. A first arm 241 is mounted between the first leg 224 and the second end of the first cylinder 233. A second arm 242 is mounted between the second leg 225 and the second end of the second cylinder 235.

The eccentric weights 230 cause the weight box 221, the first and second legs 224, 225, and the first and second plurality of rods 226, 228 to oscillate about the weight box axis 231, causing the first and second plurality of rods 226, 228 to strike plants positioned between the first and second plurality of rods 226, 228. To minimize damage done to the fruit and plants between the first and second plurality of rods 226, 228, the first and second cylinders 233, 235 cause the first and second arms 241, 245 to rotate the first and second legs 224, 225 so that contact is maintained between the first and second plurality of rods 226, 228 and the plants with a constant force (gripping force).

Figure 7:
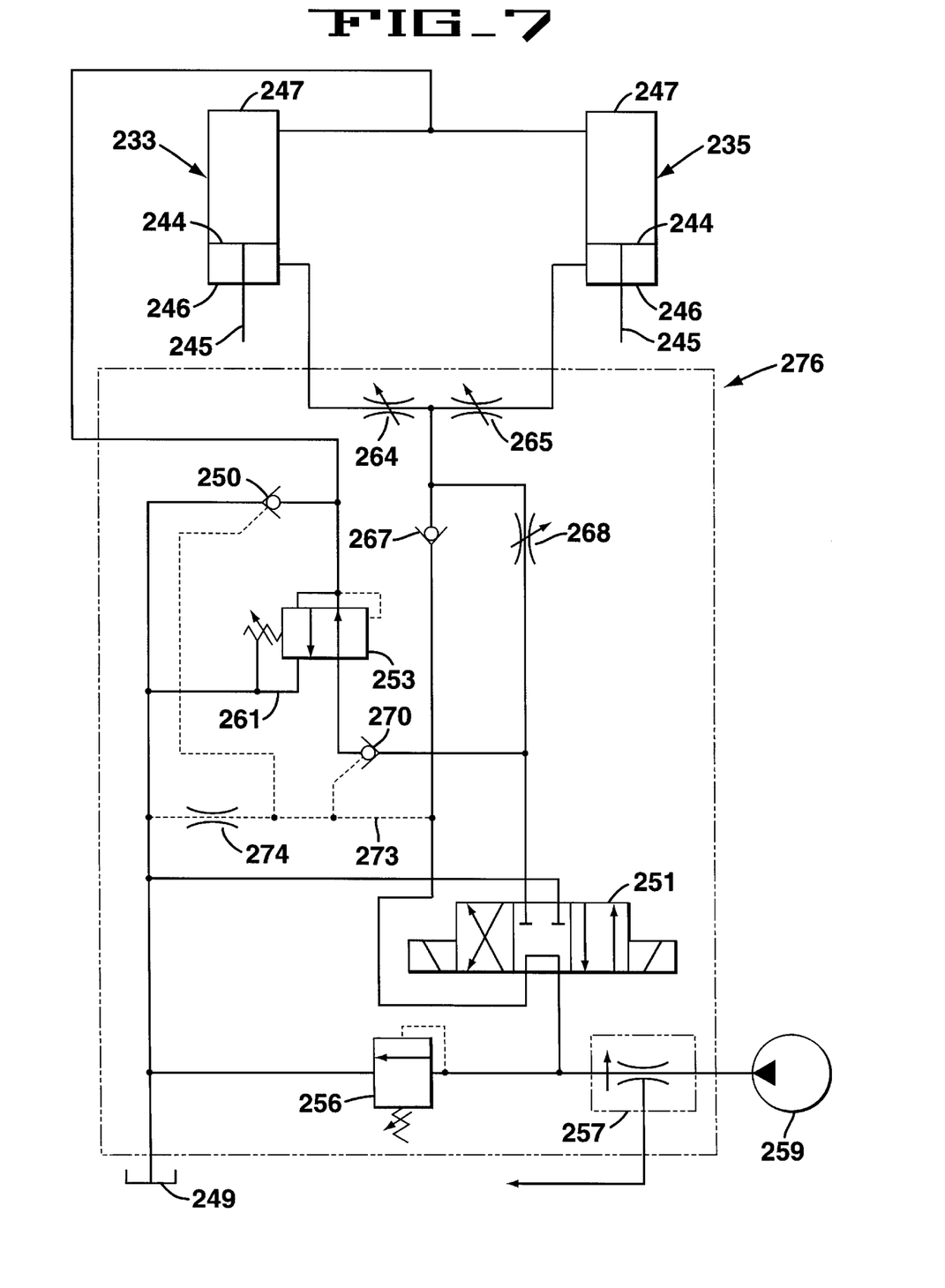
FIG. 7 is a schematic view of the hydraulic system of the harvester illustrated in FIG. 5.

FIG. 7 is a schematic illustration of the hydraulic system in fluid connection with the first hydraulic cylinder 233 and the second hydraulic cylinder 235. The first hydraulic cylinder 233 and the second hydraulic cylinder 235 each have a piston head 244 on a rod 245 passing into rod ends 246 of the first and second hydraulic cylinders 233, 235. Piston ends 247 of the hydraulic cylinders 233, 235 are opposite from the rod ends 246. The piston ends 247 of the hydraulic cylinders 233, 235 are in fluid connection with a first connection of a first pilot operated check valve 250 and a first connection of a pressure reducing valve 253. A second connection of the first pilot operated check valve 250 is in fluid connection with a reservoir 249. The rod end 246 of the first hydraulic cylinder 233 is in fluid connection with a first connection of a first flow restrictor valve 264. The rod end of the second hydraulic cylinder 235 is in fluid connection with a first connection a second flow restrictor valve 265. A second connection of the first flow restrictor valve 264 is in fluid connection with a second connection of the second flow restrictor valve 265, a first connection of a non-pilot check valve 267, and a first connection of a flow restrictor valve 268. A second connection of the non-pilot check valve 267 is in fluid connection with a third connection on a three position valve 251 and a pilot line 273. A second connection of the flow restrictor valve 268 is in fluid connection with a first connection of a second pilot operated check valve 270 and a second connection on the three position valve 251. A second connection of the second pilot operated check valve 270 is in fluid connection with a second connection of the pressure reducing valve 253. A first connection of the three position valve 251 is in fluid connection with the reservoir 249. A first connection of a pressure relief valve 256 is in fluid connection with the reservoir 249. A second connection of the pressure relief valve 256 is in fluid connection with a first connection of a priority flow divider 257 and a fourth connection of the three position valve 251. A third connection of the pressure reducing valve 253 is in fluid connection with the reservoir 249 through a pressure reducing valve drain line 261. A second connection of the priority flow divider 257 is in fluid connection with a hydraulic pump 259. The pilot line 273 is in fluid connection with the pilots of the first and second pilot operated check valves 250, 270 and to a first connection of a pilot restrictor valve 274. The second connection of the pilot restrictor valve 274 is in fluid connection with the reservoir 249.

The first restrictor valve 264, second restrictor valve 265, and float restrictor valve 268 have a Sun Part Number NFCC-LDN. The first pilot operated check valve 250 has a Sun Part Number CKCB-XCN. The pilot restrictor valve 274 is Disc-0.03 inch orifice. The pressure reducing valve 253 has a Sun Part Number PPDB-LDN. The non-pilot check valve 267 has Sun Part Number CXDA-XCN. The second pilot operated check valve 270 has a Sun Part Number CODA-XCN. The three position valve 251 is a four connection valve from Rexroth with a part number 4WE6G52/AG12NDA. The pressure relief valve 256 has a Sun Part Number RPEC-LAN. The priority flow divider 257 has a Sun Part Number FRDA-XAN-3. The first and second restrictor valves 264, 265, the float restrictor valve 268, the non-pilot check valve 267, the three position valve 251, the priority flow divider 257, the pressure relief valve 256, the pilot restrictor valve 274, the first and second pilot operated check valves 270, 250, and the reducing valve 253 make up a combination valve 276. The Sun part numbers are from a catalog provided by the Sun Hydraulics Corporation in Sarasota, Florida.

In operation, when the three position valve 251 is in the first position, the three position valve 251 directs fluid from the first connection to the third connection and fluid from the fourth connection to the second connection. Fluid passing from the hydraulic pump 259 through the priority flow divider 257 flows from the fourth connection to the second connection of the three position valve 251. Fluid passing from the second connection of the three position valve 251 flows to the second connection of the flow restrictor valve 268 and a first connection of the second pilot operated check valve 270. The fluid, which passes through the flow restrictor valve 268, passes through the first and second restrictor valves 264, 265 and to the rod ends 246 of the first and second cylinders 233, 235. Fluid, which passes through the second pilot operated check valve 270, passes through the pressure reducing valve 253 to the piston ends 247 of the first and second hydraulic cylinders 233, 235.

If pressure in the piston ends 247 of the first and second cylinders 233, 235 becomes too great, this puts pressure on the pilot of the pressure reducing valve 253 moving the pressure reducing valve over so that fluid may flow through a bypass to the reservoir 249 by way of the pressure reducing valve drain line 261. The pressure reducing valve 253 pressure is operator adjusted.

Providing hydraulic pressure on both sides of the piston head 244, provides power to both open and close the first and second plurality of rods 226, 228. Because of the cross sectional area of the piston rod 245, the area of the piston head 244 facing the rod end 246 is smaller than the area of the piston head 244 facing the piston end 247. Since the hydraulic pressure on both sides of the piston head 244 is equal, and since force on a side of a piston head 244 is equal to the area of that side times the pressure, the net constant force by the hydraulic fluid on the piston head 244 is equal to the hydraulic pressure times the difference between the area of the side of the piston head 244 facing the piston end 247 and the area of the side of the piston head 244 facing the rod end 246. The net constant force pushes the piston head 244 towards the rod end 246 providing a force to close the first and second plurality of rods 226, 228. When a plant is encountered by the first and second plurality of rods 226, 228, the first and second plurality of rods 226, 228 encounter an opposing force created by the plant, which increases the hydraulic pressure in the first and second hydraulic cylinders 233, 235, thus increasing the net constant force. The operator adjustable pressure reducing valve 253, sets the maximum pressure in the first and second hydraulic cylinders 233, 235, which sets a maximum net constant force, which sets the force required in order for the plant to spread the first and second plurality of rods 226, 228. This is the float position. The positioning of the first and second plurality of rods 226, 228 does not allow gravity to separate or close them, and so this embodiment provides power to separate or close the first and second plurality of rods 226, 228. The pressure reducing valve 253 pressure is set so that the first plurality of rods 226 and the second plurality of rods 228 close together, but that a force that will not damage plants is sufficient to spread apart the first plurality of rods 226 from the second plurality of rods 228. This keeps the first and second plurality of rods 226, 228 in constant contact and at a constant force (gripping force) with the plants.

When the three position valve 251 is in the second position, the three position valve 251 directs fluid from the fourth connection to the third connection, while stopping flow of fluid from the first and second connections. Fluid from the hydraulic pump 259 passes through the priority flow divider 257 to the fourth connection, through the three position valve 251 to the third connection, then through the first non-pilot check valve 267 to the first and second restrictor valves 264, 265 to the rod ends 246 of the first and second hydraulic cylinders 233, 235. This also places a pressure on the pilot line 273, which opens the first pilot controlled check valve 250, allowing fluid to flow from the piston ends 247 of the first and second hydraulic cylinders 233, 235 through the first pilot controlled check valve 250 to the reservoir 249. This pushes the piston heads 244 towards the piston ends 247, which causes the first arm 241 to rotate the first leg 224 and the second arm 242 to rotate the second leg 225 in such a manner that causes the distance between the first plurality of rods 226 and second plurality of rods 228 to increase. This is the spread position, because it causes the distance between the first plurality of rods 226 and the second plurality of rods 228 to increase and thus spreads the first plurality of rods 226 and second plurality of rods 228 apart. The first plurality of rods 226 and second plurality of rods 228 continue to spread until the first and second hydraulic cylinders 233, 235 are completely collapsed. At this point fluid from the priority flow divider 257 passes through the relief valve 256 to the reservoir 249.

When the three position valve 251 is in the third position, the three position valve 251 directs fluid from the fourth connection to the first connection, and fluid from the second connection to the third connection. Fluid passing from the hydraulic pump 259 through the priority flow divider 257 flows from the fourth connection to the first connection and then to the reservoir 249. This is the static position. The purpose of the static position is to dump fluid from the hydraulic pump 259 directly to the reservoir 249, without creating resistance heat by porting it through the pressure relief valve 256.

In the field, the spread position is used to spread the first plurality of rods 226 from the second plurality of rods 228. The static position is used for maintenance and transportation, when it is desired that the distance between the first plurality of rods 226 and the second plurality of rods 228 be kept constant. The harvester 220 is driven so that plants, such as grape vines, pass between the first plurality of rods 226 and the second plurality of rods 228. The three position valve 251 is set to the first position, which is the float position. In the float position the force from the plants is able to cause the first plurality of rods 226 and the second plurality of rods 228 to spread to allow passage of the plants in between the first plurality of rods 226 and the second plurality of rods 228. In the float position, the first and second plurality of rods 226, 228 are kept in contact with the plant, with the hydraulic system forcing the first plurality of rods 226 and the second plurality of rods 228 together to apply a constant gripping force to the plant. The eccentric weights 230 cause an alternating force to be applied by the first and second plurality of rods 226, 228. Since the first and second plurality of rods 226, 228 are in contact with the plant and exert a constant gripping force on the plants, slapping by the first and second plurality of rods 226, 228 to the plant is eliminated, reducing damage to the plant, while the alternating force applied by the eccentric weights 230 through the first and second plurality of rods 226, 228 cause the harvesting.

The adjustable flow restrictors are to control the speed of operation of the cylinders The invention may be practiced without adjustable flow restrictors.

Figure 8:
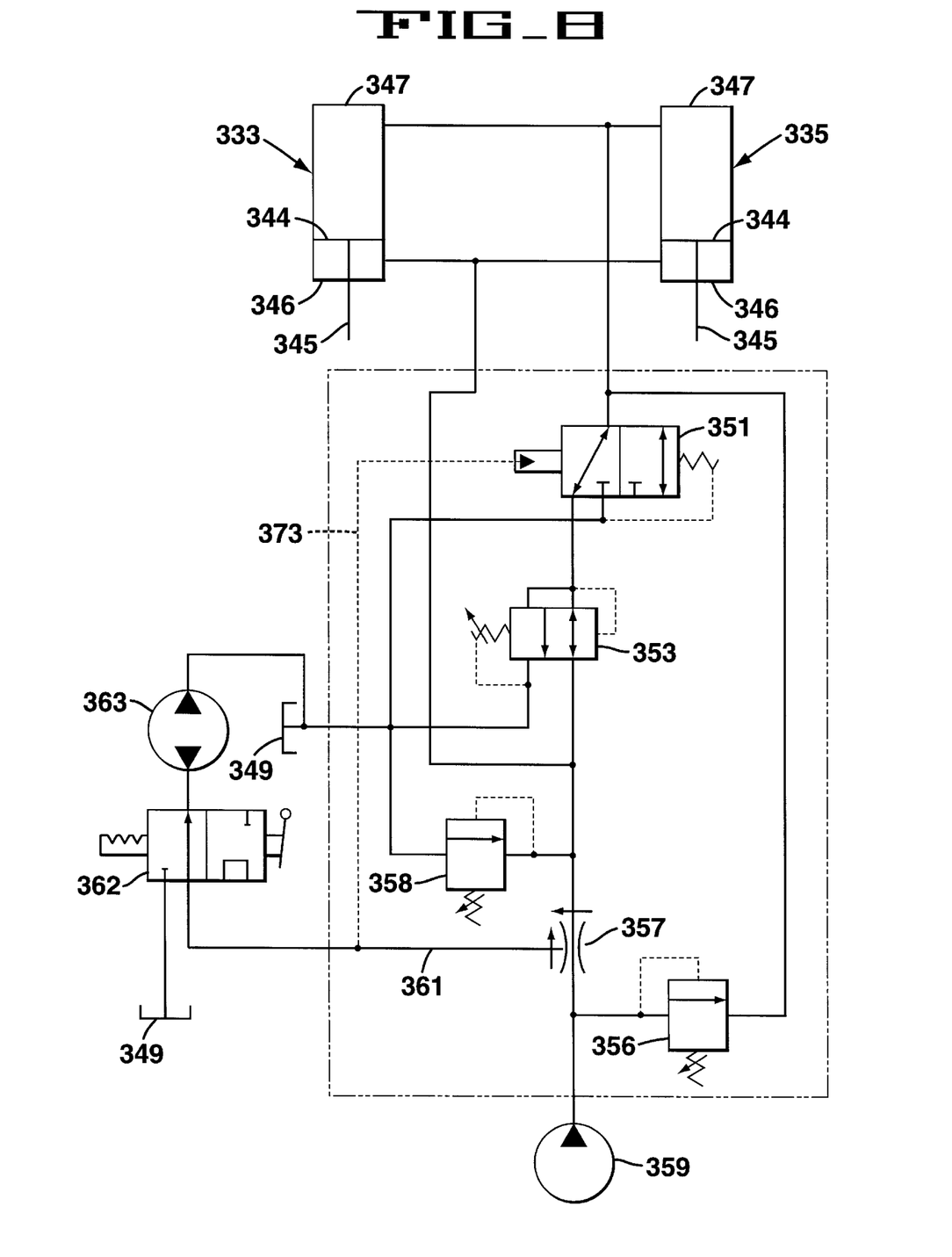
FIG. 8 is a schematic view of another embodiment of a hydraulic system which may be used in a preferred embodiment of the invention used in the harvester illustrated in FIG. 5.

FIG. 8 is a schematic illustration of a hydraulic system in fluid connection with a first hydraulic cylinder 333 and a second hydraulic cylinder 335, which may be used in the harvester illustrated in FIGS. 5 and 6, with the first hydraulic cylinder 333 of this embodiment replacing the first hydraulic cylinder 233, and the second hydraulic cylinder 335 of this embodiment replacing the second hydraulic cylinder 235 of FIGS. 5 and 6. The first hydraulic cylinder 333 and the second hydraulic cylinder 335 each have a piston head 344 on a rod 345 passing into rod ends 346 of the first and second hydraulic cylinders 333, 335. Piston ends 347 of the hydraulic cylinders 333, 335 are opposite from the rod ends 346. The piston ends 347 of the hydraulic cylinders 333, 335 are in fluid connection with a first connection of a two position valve 351 and a first connection of a first pressure relief valve 356. The rod end 346 of the first hydraulic cylinder 333 is in fluid connection with a first connection of a pressure reducing valve 353, a first connection of a second pressure relief valve 358, and a first connection of a priority flow divider 357. A second connection of the pressure reducing valve 353 is in fluid connection with a second connection on the two position valve 351. A reservoir 349 is in fluid connection with a third connection of the two position valve 351, a third connection of the pressure reducing valve 353, and a second connection of the second pressure relief valve 358. A second connection of the priority flow divider 357 is in fluid connection with a hydraulic pump 359 and a second connection of the first pressure relief valve 356. A third connection of the priority flow divider is connected by a diverter line 361 to a fourth pressure actuated pilot connection of the two position valve 351 through pilot fluid connection line 373 and through an on/off valve 362 to another harvesting function such as the motor 363 which drives the eccentric weights 230 of the machine.

In operation, when the on/off valve 362 is placed in the "on" position as illustrated in FIG. 8, the motor 363 is driven, placing a resistance pressure in the diverter line 361, which creates a pressure in the pilot fluid connection 373. The two position valve 351 is pressure controlled and automatically moves to the first position which is the float position whenever the harvesting system is activated by the operator. This is caused by pilot pressure in pilot fluid connection line 373. The two position valve 351 directs fluid between the first connection and the second connection while stopping the flow from the third connection of the two position valve 351. Fluid passes from the hydraulic pump 359 through the priority flow divider 357 to the first connection of the pressure reducing valve 353, the first connection of the second relief valve 358, and the rod ends 346 of the first and second cylinders 333, 335. Fluid passing to the first connection of the pressure reducing valve 353 flows to the second connection of the pressure reducing valve 353 and then to the second connection of the two position valve 351. Fluid passing from the second connection of the two position valve 351 flows to the first connection of the two position valve 351 and then to the piston ends 347 of the first and second cylinders 333, 335 and the first connection of the first pressure relief valve 356. If pressure in the piston ends 347 the first and second cylinders 333, 335 becomes too great, this puts pressure on the pilot of the pressure reducing valve 353 moving the pressure reducing valve over so that fluid may flow through a bypass to the reservoir 349. The pressure reducing valve 353 pressure is operator adjusted.

Providing hydraulic pressure on both sides of the piston head 344, provides power to both open and close the first and second plurality of rods 226, 228. Because of the cross sectional area of the piston rod 345, the area of the piston head 344 facing the rod end 346 is smaller than the area of the piston head 344 facing the piston end 347. Since the hydraulic pressure on both sides of the piston head 344 is equal, and since force on a side of a piston head 344 is equal to the area of that side times the pressure, the net constant force by the hydraulic fluid on the piston head 344 is equal to the hydraulic pressure times the difference between the area of the side of the piston head 344 facing the piston end 347 and the area of the side of the piston head 344 facing the rod end 346. The net constant force pushes the piston head 344 towards the rod end 346 providing a force to close the first and second plurality of rods 226, 228. When a plant is encountered by the first and second plurality of rods 226, 228, the first and second plurality of rods 226, 228 encounter an opposing force created by the plant, which increases the hydraulic pressure in the first and second hydraulic cylinders 333, 335, thus increasing the net constant force. The operator adjustable pressure reducing valve 353, sets the maximum pressure in the first and second hydraulic cylinders 333, 335, which sets a maximum net constant force, which sets the force required in order for the plant to spread the first and second plurality of rods 326, 328. This is the float position. The positioning of the first and second plurality of rods 226, 228 does not allow gravity to separate or close them, and so this embodiment provides power to separate or close the first and second plurality of rods 226, 228. The pressure reducing valve 353 pressure is set so that the first plurality of rods 226 and the second plurality of rods 228 close together, but that a force, that will not damage plants, is sufficient to spread apart the first plurality of rods 226 from the second plurality of rods 228. This keeps the first and second plurality of rods 226, 228 in constant contact and at a constant gripping force with the plants.

When the on/off valve 362 is in the "off" position, then no pilot pressure is applied to pilot fluid connection line 373, causing the two position valve 351 to shift to the second position. When the two position valve 351 is in the second position the two position valve 351 directs fluid between the first connection and the third connection, while stopping flow of fluid from the second connection. Fluid passes from the hydraulic pump 359 through the priority flow divider 357 to the first connection of the pressure reducing valve 353, the first connection of the second relief valve 358, and the rod ends of the first and second cylinders 333, 335. Fluid passing to the first connection of the pressure reducing valve 353 flows to the second connection of the pressure reducing valve 353 and then to the second connection of the two position valve 351 where the flow is stopped. The fluid in the piston ends 347 of the first and second cylinders 333, 335 flows to the first connection of the two position valve 351, then to the third connection of the two position valve 351, and then to the reservoir 349. This pushes the piston heads 344 towards the piston ends 347, which causes the first arm 241 to rotate the first leg 224 and the second arm 242 to rotate the second leg 225 in such a manner that causes the distance between the first plurality of rods 226 and second plurality of rods 228 to increase. This is the spread position, because it causes the distance between the first plurality of rods 226 and the second plurality of rods 228 to increase and thus spreads the first plurality of rods 226 and second plurality of rods 228 apart. The first plurality of rods 226 and second plurality of rods 228 continue to spread until the first and second hydraulic cylinders 233, 235 are completely collapsed. At this point fluid from the hydraulic pump 359 flows through the excess flow port which is the third connection of priority flow divider 357, and then through the line 361 and the on/off valve 362 to the reservoir 349 and through the controlled flow port which is the first connection of priority flow divider 357, then through the second pressure relief valve 358 to the reservoir 349.

In the field, the spread position is used to spread the first plurality of rods 226 from the second plurality of rods 228. The spread position is used in place of the static position. Instead of directing fluid directly from the hydraulic pump to the reservoir, the small amount of fluid that operates hydraulic cylinders 333, 335 passes through pressure relief valve 358, which increases frictional fluid losses which are negligible. The harvester 220 is driven so that plants, such as grape vines, pass between the first plurality of rods 226 and the second plurality of rods 228. The two position valve 351 is set to the first position, which is the float position. In the float position the force from the plants is able to cause the first plurality of rods 226 and the second plurality of rods 228 to spread to allow passage of the plants in between the first plurality of rods 226 and the second plurality of rods 228. In the float position, the first and second plurality of rods 226, 228 are kept in contact with the plant, with the hydraulic system forcing the first plurality of rods 226 and the second plurality of rods 228 together to apply a constant gripping force to the plant. The eccentric weights 230 cause an alternating force to be applied by the first and second plurality of rods 226, 228. Since the first and second plurality of rods 226, 228 are in contact with the plant and exert a constant gripping force on the plants, slapping by the first and second plurality of rods 226, 228 to the plant is eliminated, reducing damage to the plant, while the alternating force applied by the eccentric weights 230 through the first and second plurality of rods 226, 228 cause the harvesting.

The striker bars 24, 25 and the first and second plurality of rods 226, 228 may more generally be called rails, so that the rails in both embodiments are applied against the vines with a constant gripping force.

While preferred embodiments of the present invention have been shown and described herein, it will be appreciated that various changes and modifications may be made therein without departing from the spirit of the invention as defined by the scope of the appended claims; for example, the hydraulic system illustrated in FIG. 4 could be used to control the harvester illustrated in FIG. 5, and the hydraulic systems illustrated in FIGS. 7 and 8 could be used to control the harvester illustrated in FIGS. 1 and 2.

What is claimed is:

1. An apparatus for harvesting fruit from plants arranged in a row in the ground as the apparatus is driven along the row, comprising:
   a main frame;
   means for applying an alternating force to said plants wherein the means includes a first member on a first side of the plants and a second member on a second side of the plants mounted on the main frame, and wherein the alternating force alternates between the direction towards the first member and then the direction towards the second member; and
   means for keeping the first member and the second member in continuous contact with the plants independent of varying thickness of the plants while permitting said first and second members to move relative to the plants as the apparatus is driven along the row, wherein said means for keeping is mounted on the main frame.

2. The apparatus for harvesting, as recited in claim 1, further comprising, a first hydraulic cylinder mechanically connected to the first member and in fluid connection with the means for keeping.

3. The apparatus, as recited in claim 2, wherein the means for applying an alternating force, further comprises an eccentric weight system mechanically connected between the first member and the second member.

4. The apparatus, as recited in claim 3, wherein the means for keeping, comprises:
   a hydraulic pump in fluid connection with a first end of the first hydraulic cylinder;
   a pressure reducing valve in fluid connection with a second end of the first hydraulic cylinder; and
   a reservoir.

5. The apparatus, as recited in claim 4, wherein the means for keeping, further comprises, a switch which has a first position for spreading the first member from the second member, and a second position, which pushes the first member towards the second member with a constant gripping force, wherein the switch is in fluid connection with the hydraulic pump and the pressure reducing valve, and wherein the hydraulic cylinder has a piston head with an area, a rod connected to the piston head wherein the rod has a cross sectional area, wherein a magnitude of the constant gripping force is set by a pressure setting of the pressure reducing valve and a difference in area between the area of the piston head and the cross-sectional area of the rod.

6. The apparatus, as recited in claim 1,
   wherein the first member, comprises:
      a first shaker arm, extending from the main frame to below the eccentric weight system; and
      a first shaker rail, extending from the first shaker arm;
   and wherein the second member, comprises:
      a second shaker arm extending from the main frame to below the eccentric weight system; and
      a second shaker rail, extending from the second shaker arm.

7. The apparatus, as recited in claim 6, further comprising a first hydraulic cylinder mechanically connected between the first shaker arm and the second shaker arm and in fluid connection with the means for keeping the first member and the second member in continuous contact with the plants.

8. The apparatus, as recited in claim 7, wherein the means for applying an alternating force, further comprises an eccentric weight system mechanically connected between the first shaker arm and the second shaker arm.

9. The apparatus, as recited in claim 8, wherein the means for keeping, comprises:
   a hydraulic pump in fluid connection with a first end of the first hydraulic cylinder;
   a pressure reducing valve in fluid connection with a second end of the first hydraulic cylinder, wherein the pressure reducing valve has an adjustable relief pressure; and
   a reservoir.

10. The apparatus, as recited in claim 9, wherein the means for keeping, further comprises, switch which has a first position for spreading the first shaker rail from the second shaker rail and a second position, which pushes the first shaker rail towards the second shaker rail with a constant gripping force, wherein the switch is in fluid connection with the hydraulic pump and the pressure reducing valve, and wherein the hydraulic cylinder has a piston head with an area and a rod connected to the piston head wherein the rod has a cross sectional area, and wherein a magnitude of the constant gripping force is set by a pressure setting of the pressure reducing valve and a difference in area between the area of the piston head and the cross-sectional area of the rod.

11. The apparatus, as recited in claim 1, further comprising:
   a center piece, rotatably mounted to the main frame;
   wherein the first member, comprises:
      a first leg, rotatably connected to a first end of the center piece and extending from the center piece to below the center piece; and
      a first plurality of rods mechanically connected to the first leg;
   and wherein the second member, comprises:
      a second leg rotatably mounted to a second end of the center piece extending from the center piece to below the center piece; and
      a second plurality of rods mechanically connected to the second leg.

12. The apparatus for harvesting, as recited in claim 11, further comprising:
   a first arm with a first end mechanically connected to the first leg;
   a first hydraulic cylinder mechanically connected between the center piece and a second end of the first arm;
   a second arm with a first end mechanically connected to the second leg; and
   a second hydraulic cylinder mechanically connected between the center piece and a second end of the second arm.

13. The apparatus, as recited in claim 12, wherein the means for applying an alternating force, further comprises an eccentric weight system mechanically connected to the center piece.

14. The apparatus, as recited in claim 13, wherein the means for keeping, comprises:
   a hydraulic pump in fluid connection with a first end of the first hydraulic cylinder and a first end of the second hydraulic cylinder;
   a pressure reducing valve, wherein the pressure reducing valve has an adjustable pressure and is in fluid connection with a second end of the first hydraulic cylinder and a second end of the second hydraulic cylinder; and
   a reservoir.

15. The apparatus, as recited in claim 14, wherein the means for keeping, further comprises, a switch which has a first position for spreading the first plurality of rods from the second plurality of rods, and a second position, which pushes the first plurality of rods towards the second plurality of rods with a constant gripping force, wherein the switch is in fluid connection with the hydraulic pump and the pressure relief valve, and wherein a magnitude constant gripping force is set by the pressure reducing valve.

16. A method for harvesting fruit from plants arranged in a row in the ground, comprising the steps of:
   moving a harvester along the row so that the plants are located between a first member and a second member of the harvester;
   using the plants to separate the first member from the second member, so that the first member is on one side of the plants and the second member is on an opposite side of the plants;
   applying a constant gripping force to the first member and the second member pushing the first and second members towards each other, so that the first member and the second member are in continuous contact with the plants while permitting relative movement therebetween as the harvester moves along the row; and
   applying an alternating force through the first member and second member to the plants.

17. The method of harvesting, as recited in claim 16, wherein the step of applying an alternating force, comprises the steps of:
   applying a net total force in the direction of the first member; and
   applying a net total force in the direction of the second member, alternating between these steps over several cycles.

18. The method of harvesting, as recited in claim 17, further comprising the steps of:
   catching and conveying fruits dislodged from the plants;
   spreading the first member from the second member.

19. The method of harvesting, as recited in claim 17, wherein the net forces created by the step of applying a net force in the direction of the first member and the step of applying a net force in the direction of the second member is exerted against trunks of the plants.

20. The method of harvesting, as recited in claim 17, wherein the step of applying a net total force in the direction of the first member and the step of applying a net total force in the direction of the second member, apply the net total force against canopies of the plants.

* * * * *